(12) United States Patent
Lucca (10) Patent No.: US 11,957,076 B2
(45) Date of Patent: Apr. 16, 2024

(54) METHOD FOR ACTUATING THE CUTTING DISCS OF THE DIVIDERS IN A SUGAR CANE HARVESTER

(71) Applicant: CNH Industrial America LLC, New Holland, PA (US)

(72) Inventor: João Augusto Marcolin Lucca, São Pedro (BR)

(73) Assignee: CNH Industrial America LLC, New Holland, PA (US)

(*) Notice: Subject to any disclaimer, the term of this patent is extended or adjusted under 35 U.S.C. 154(b) by 1029 days.

(21) Appl. No.: 16/643,840

(22) PCT Filed: Aug. 30, 2018

(86) PCT No.: PCT/BR2018/050308
§ 371 (c)(1),
(2) Date: Dec. 4, 2020

(87) PCT Pub. No.: WO2019/041012
PCT Pub. Date: Mar. 7, 2019

(65) Prior Publication Data
US 2021/0204478 A1    Jul. 8, 2021

(30) Foreign Application Priority Data
Aug. 31, 2017 (BR) .......................... 102017018685-7

(51) Int. Cl.
*A01D 45/10*    (2006.01)
*A01D 43/08*    (2006.01)
(Continued)

(52) U.S. Cl.
CPC ........... *A01D 45/10* (2013.01); *A01D 75/182* (2013.01); *A01D 43/085* (2013.01); *A01D 63/02* (2013.01)

(58) Field of Classification Search
CPC .... A01D 45/10; A01D 43/085; A01D 34/006; A01D 75/182; A01D 63/02
See application file for complete search history.

(56) References Cited

U.S. PATENT DOCUMENTS

| 2,703,956 A | * | 3/1955 | Pool | ...................... A01D 45/10 |
| | | | | 172/120 |
| 3,791,114 A | | 2/1974 | Fowler | |

(Continued)

FOREIGN PATENT DOCUMENTS

| AU | 2015202751 A1 * 12/2015 | ............. A01B 63/00 |
| BR | 102015014942 A2   12/2016 | |

(Continued)

OTHER PUBLICATIONS

Miyamoto—WO-2017094588-A1 English translation Jun. 8, 2017.*
(Continued)

*Primary Examiner* — Thomas B Will
*Assistant Examiner* — Julia C Tran
(74) *Attorney, Agent, or Firm* — Peter K. Zacharias (57) ABSTRACT

A method for controlled activation of cutting discs of row dividers of a machine for harvesting tall, stalky plants, such as sugarcane and sorghum. The method is used in a harvester machine including an operating cabin, at least one row divider equipped with at least one lollipop activated rotationally, and at least one cutting disc activated rotationally. The method includes steps of measuring a workload of the lollipops, comparing the workload of the lollipops with a predefined workload threshold in order to, thus, determine whether to reinitiate the measurement of the workload or to activate the at least one cutting disk.

20 Claims, 5 Drawing Sheets

(51) Int. Cl.
*A01D 63/02* (2006.01)
*A01D 75/18* (2006.01)

(56) References Cited

U.S. PATENT DOCUMENTS

| | | | |
|---|---|---|---|
| 4,069,928 A | | 1/1978 | Teske et al. |
| 4,154,047 A | * | 5/1979 | Quick .................... A01D 45/10 56/53 |
| 4,722,174 A | | 2/1988 | Landry et al. |
| 4,967,544 A | | 11/1990 | Ziegler et al. |
| 7,797,915 B1 | | 9/2010 | Kallara et al. |
| 2016/0135365 A1 | | 5/2016 | Cleodolphi et al. |

FOREIGN PATENT DOCUMENTS

| | | | | |
|---|---|---|---|---|
| BR | 102016007269 A2 | * | 3/2017 | ........... A01D 34/416 |
| BR | 102013024752 A2 | | 5/2017 | |
| CN | 105201939 A | | 12/2015 | |
| WO | WO-2015003058 A2 | * | 1/2015 | ........... A01D 34/006 |
| WO | WO-2017094588 A1 | * | 6/2017 | ............. A01D 45/10 |

OTHER PUBLICATIONS

Luiz—BR-102016007269-A2 Eglish translation Mar. 1, 2017.*
International Search Report and Written Opinion for Application No. PCT/BR2019050308 dated Dec. 19, 2018 (11 pages).

* cited by examiner

METHOD FOR ACTUATING THE CUTTING DISCS OF THE DIVIDERS IN A SUGAR CANE HARVESTER

FIELD OF THE INVENTION

In general terms, this invention concerns a method of activating cutting discs provided in the row dividers of a harvester machine, specifically a machine for harvesting tall, stalky plants such as sugar cane and sorghum.

The invention also concerns an agricultural machine for harvesting tall, stalky plants which is capable of executing the method in question.

BACKGROUNDS OF INVENTION

There is a wide variety of models of agricultural machinery and equipment designed to enable harvesting in a broad variety of fields, which are highly irregular and increasingly require new resources to adapt the operating parameters of these machines in order to obtain improvements in the productivity of the harvesting of the various types of vegetable crops currently known.

Specifically, in the case of tall, stalky plants, such as sugarcane and sorghum, the planting is usually realized in lines, which are spaced out at relatively fixed and predetermined distances between each other of 0.9 m or 1.5 m, or with alternating spacings of 0.9 m and 1.5 m. This type of planting configuration in lines allows for and facilitates the movement of harvester machinery through the plantations.

Although there are these spacings between the planting lines, tall stalky plants, such as sugarcane and sorghum, tend to bend over and entwine with each other as they develop and grow. As a result, it is quite common for some plants in a planting line to bend toward the plants of the adjacent planting line. For this reason, sugarcane and sorghum harvester machines are equipped with so-called row dividers that are formed of lollipops equipped with spirals that rotate in opposite directions to each other. These row dividers are positioned in the front portion of the machine, or the platform if a header is used, precisely to enable the separation of the plants from the planting line that is being harvested and the plants of the adjacent planting line.

Although they are functional, there are situations when the activation of the rotating lollipops alone is not enough to separate the plants from different planting lines. In these situations, particularly in the past, it was very common to pull up the plants from the ground by the root, which is to say, when the plants from different planting lines got so tangled up that the lollipops of the row dividers could not separate them, the machine pulled up the plants instead of cutting them, which affected the productivity and quality of the harvest, in addition to causing damage to the next harvest.

In order to prevent the plants from being pulled up, the structure of the row dividers received a cutting disc positioned between the two lollipops. Thus, when the operator found that there was entanglement between plants from parallel and adjacent planting lines which the lollipops could not separate, the said cutting disc was activated with the aim of cutting and eliminating any possible knots formed between the plants and the row dividers.

It is not just plants from adjacent planting lines that can get entangled in the row dividers, but the sugarcane foliage itself, when excessive, can also get entangled between the row dividers and prevent the proper functioning thereof.

However, controlling the real need to activate the cutting discs of the row dividers is a purely empirical activity, where the operator judges the need or otherwise to activate the discs, without any data or technical information that supports the need for such activation.

More specifically, as is generally known to persons skilled in the art, these sugarcane and sorghum harvester machines are highly complex and possess many mechanisms that the operator needs to control properly so as not to compromise the proper harvesting. Thus, it was found that failures could occur in relation to the activation of these cutting discs of the row dividers at the crucial moment, since the operator had many other tasks to pay attention to and, when it came to verifying the entanglement of the plants, this could occur too late, and the machine could end up pulling up or breaking the stems, often without the operator's noticing, thus, compromising the productivity of the harvest.

Additionally, the awareness and sensitivity regarding the need to activate the cited cutting discs of the row dividers depended wholly on the knowledge and experience of the operator. Without this prior technical knowledge, the damage would undoubtedly be greater.

Solutions to these and other disadvantages of the state of the art are the objectives which this invention seeks to achieve.

DESCRIPTION OF THE INVENTION

So, it is one of the objectives of the invention to provide a method of controlled activation of the cutting discs of the row dividers of a machine for harvesting tall, stalky plants, such as sugarcane and sorghum, which method comprises a sequence of steps developed to ensure that any knots formed between the plants are cut before they are pulled from the ground or can damage the plantation or the row dividers, thereby achieving an improvement in the productivity and quality of the mechanized harvests.

Additionally, the present invention also aims to produce an agricultural machine, particularly of the harvesting type, which is able to execute the method of activating the cutting discs of the row dividers in accordance with the present invention.

Thus, in order to achieve the objectives and technical effects mentioned above, without prejudice to any others, the invention concerns a method for activating the cutting discs positioned in the row dividers of a harvester machine which possesses an operation and control cabin, at least one row divider formed by at least one lollipop that moves rotationally and at least one cutting disc, that is also activated rotationally. The method comprises the steps of: (a) measuring the workload in the said at least one lollipop; (b) comparing the workload measured with the workload threshold of said lollipop, which is based on a reference threshold value, so that (b1) if the workload is less than the workload threshold, it reinitiates the measuring of the step (a); or (b2) if the workload is greater than the workload threshold, it causes the activation of the cutting disc.

In accordance with one mode of realization of the present invention, the said harvester machine is equipped with two row dividers, each of which consists of two lollipops that move in opposite directions, and each row divider also has a cutting disc mounted between the said lollipops. These cutting discs can be mounted on articulated arms capable of moving the cutting discs vertically between an upper position and another lower position. Optionally, these articulated arms can be activated by means of a hydraulic cylinder.

In accordance with another embodiment of the method of the present invention, before step (a) of measuring the workload in the lollipops, a stage of adjusting and defining the said workload threshold of the lollipops is realized, which will be the reference for step (b) of comparing the workloads and, consequently, will cause, or not, the activation of the cutting disc.

In accordance with the possible realizations of this invention, the said lollipop may be activated using a hydraulic engine and, in this case, the measurement of the workload, performed in step (a), will be the measurement of the hydraulic pressure. Optionally, these lollipops may be triggered by means of an electric engine and, in this case, the measurement of the workload, performed in step (a), will be the measurement of the electric current of the engine for activating the lollipop.

Additionally, the method of this invention may comprise the step of keeping the cutting discs activated for a predetermined period of time, or optionally this step can be configured so that the cutting disks remain activated until the workload returns to a value lower than the reference threshold workload value.

Another step that can be used in the method, in accordance with the present invention, is to lower the cutting disc to a lower position, which will be performed simultaneously or after the said step (b2) of activating the cutting discs. Also, in this case, the method may comprise the step of raising the cutting disk after a predetermined time period and/or until the workload returns to a value that is lower than the workload threshold reference value.

The method of the present invention also comprises a final step of deactivating the cutting discs, particularly when it is detected that the workload in the lollipops is below the value of the predefined workload threshold.

In one embodiment of the present invention, at the moment when the said step (b2) of activating the cutting discs is performed, a warning signal is issued to the operator of the harvester machine, inside the operation and control cabin.

Additionally, in accordance with another embodiment of the present invention, the workload threshold of the said lollipops is defined between a value of 900 psi (about 62 bar) and 1500 psi (about 103 bar), more specifically being in the order of 1200 psi (about 83 bar).

Also, in accordance with another embodiment of the method in accordance with the present invention, the said predetermined time period may vary between 5 and 60 seconds, and, in accordance with a more specific embodiment, this predetermined time period is in the order of 20 seconds.

In accordance with another embodiment of the present invention, the measurement of the lollipops performed in stage (a) is independent, and the activation of the cutting discs is also performed independently.

In accordance with another embodiment of the present invention, the stages of measuring the workloads in the said lollipops are realized with the aid of appropriate sensors, and in accordance with the means of activation adopted for the lollipops, which may be, for example, a pressure sensor, a rotation sensor, an electric charge sensor, their variants and/or combinations thereof.

The present invention also concerns a harvester machine, specifically a harvester of tall, stalky plants, which is formed of a chassis mounted on belts or wheels, a drive motor, an operation and control cabin, where the front portion of the said chassis contains at least one row divider equipped with at least one rotationally activated lollipop and at least one rotationally driven cutting disc arranged close or adjacent to that said at least one lollipop. The machine is configured to be able to perform the method of activating the cutting discs of the row dividers, as defined by the present invention.

The invention also concerns a header comprising row dividers with cutting discs for the row dividers, the cutting discs being activated rotationally and being able to move between an upper position and a lower position, the platform being characterized by the fact that it is configured to execute the method as defined above.

SUMMARIZED DESCRIPTION OF THE DRAWINGS

The characteristics, advantages and technical effects of the present invention will be better understood by a person skilled in the art from the following detailed description, provided for merely illustrative, non-restrictive purposes, of preferred embodiments, and with reference to the attached schematic figures, where.

DESCRIPTION OF EMBODIMENTS OF THE INVENTION

The invention is hereby described in relation to its specific embodiments, with reference to the attached figures. These figures are schematic, and their dimensions and/or proportions may not correspond to reality, since they are intended to describe the invention didactically. Moreover, certain known and common constructive details may have been omitted for greater clarity and conciseness of the following description. The reference numbers used are repeated throughout the figures to identify identical or similar parts. The terms that may be used such as "above", "below", "front", "back", "right", "left" etc. and their variants must be interpreted in accordance with the guidelines provided in FIGS. 1 and 2.

Figure 1:
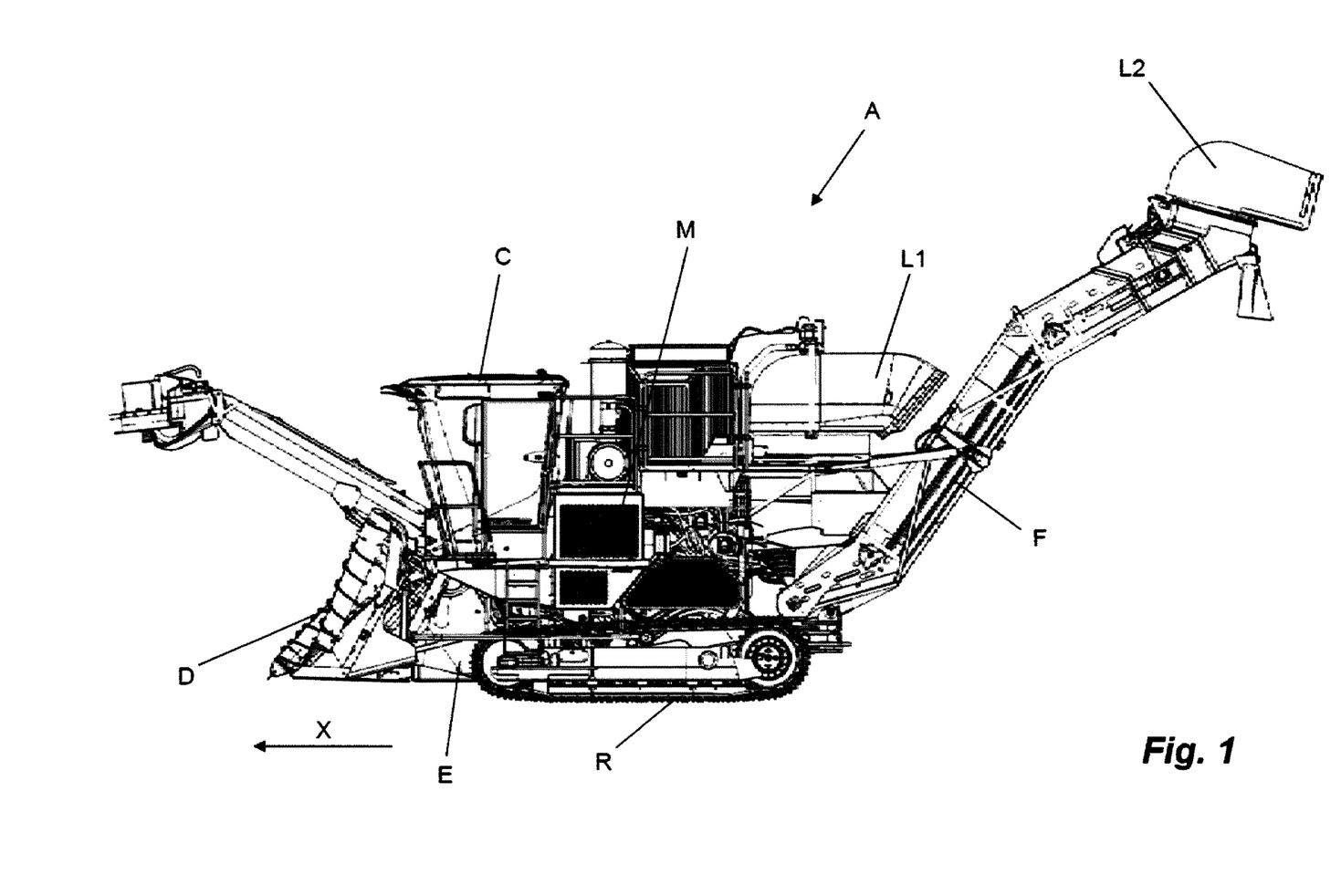
FIG. 1 shows a side view representation of a sugarcane and/or sweet sorghum harvester machine which incorporates the method of the present invention.

FIG. 1 illustrates a schematic representation of an agricultural machine (A) of the tall, stalky plant harvesting type. The harvester machine (A) may be, for example, a machine known to the state of the art, such as the sugarcane harvester of CNH Industrial N.V. marketed under the Case IH brand. The machine (A) moves over the ground in a harvesting direction, as represented by the arrow (X), and potentially in the opposite direction during the field maneuvers.

The machine (A) comprises a chassis (E) mounted on belts (R) or wheels, a drive motor (M), an operation and control cabin (C), where the front portion of said chassis comprises row dividers (D), knockdown rollers and base cutting discs. The machine (A) is also equipped with a primary cleaning extractor system (L1) and a secondary cleaning extractor system (L2) which are connected by means of an elevator (F) which transfers the cane setts, for example, to an overflow or bucket (not represented).

Alternatively, the harvester machine comprises a chassis (E) where the front portion has been adapted to receive a header, where the header comprises row dividers with cutting discs for the row dividers, as well as other sugarcane harvesting and cutting elements such as knockdown rollers, base cutting discs, lifting and carrier rollers. A harvester machine adapted to receive a header is revealed, for example, in the publication US2014/0174048, incorporated into the present document for reference purposes. A sugarcane header is revealed, for example, in the publication BR 10 2015 015922-6, incorporated into the present document for reference purposes. The following method can be used both in a conventional harvester machine, as described here in one example of realization, and in a harvester machine associated with a header.

Figure 2:
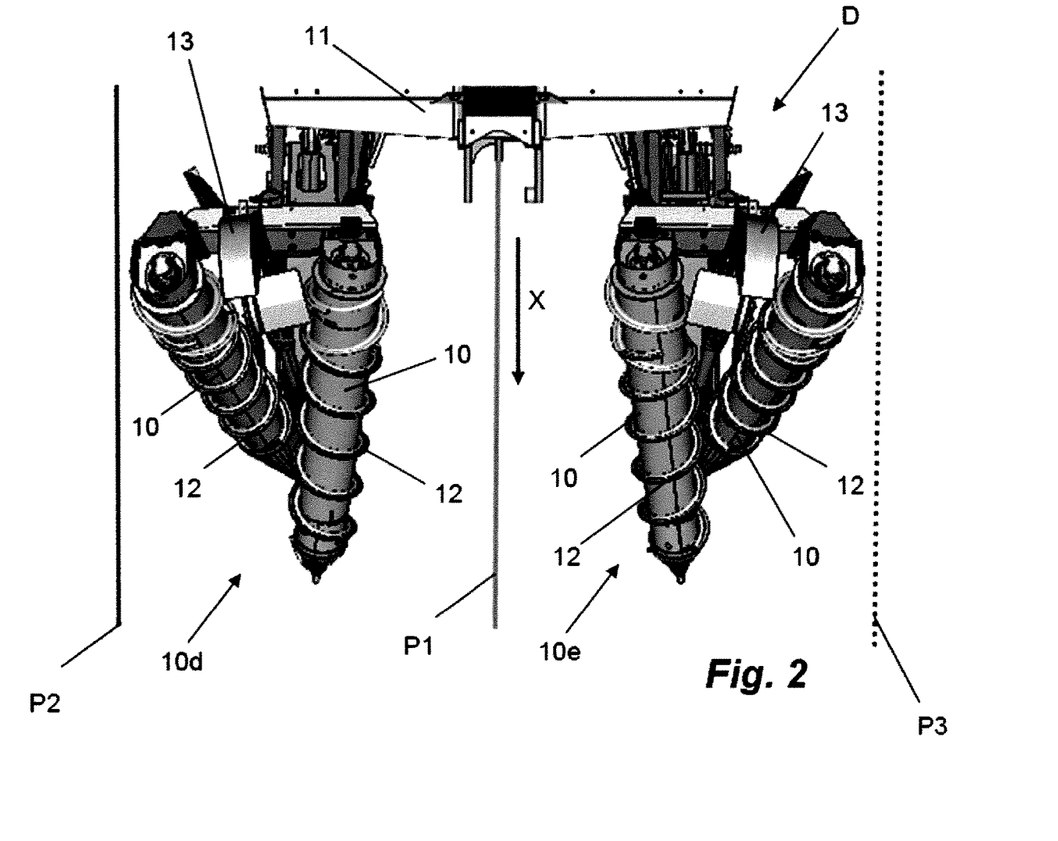
FIG. 2 shows a top view in a schematic representation of the front portion of the machine and its row dividers.
Figure 3:
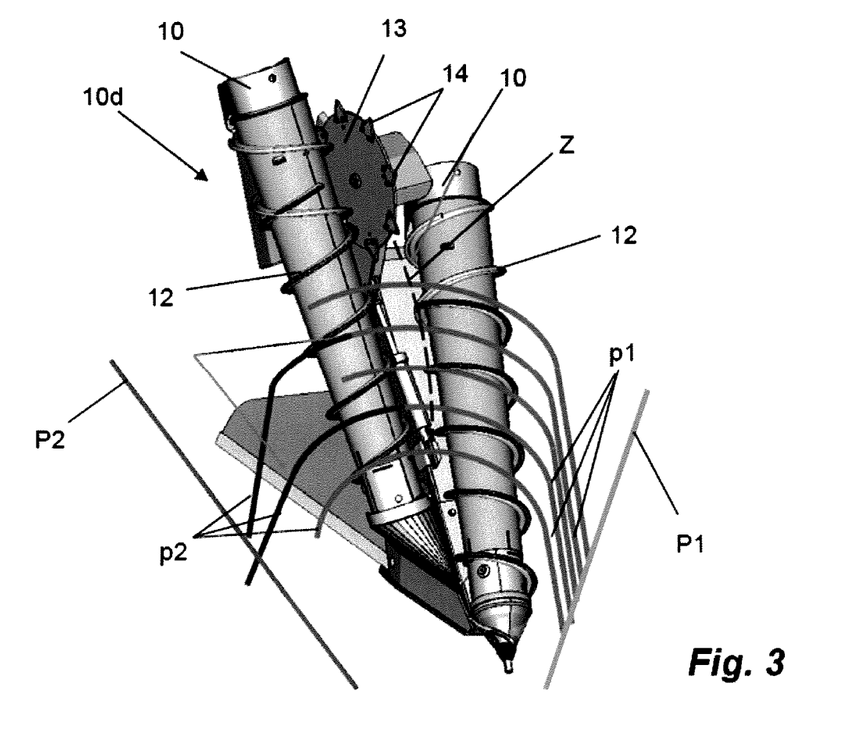
FIG. 3 shows a perspective view of a schematic representation of the row dividers operating on a plantation.

With respect to FIGS. 2 and 3, the structures of the row dividers (D) are represented, consisting of two pairs of lollipops 10d, 10e that are supported in a frame 11 fixed to the said chassis (E) of the machine (A). In general terms, the said lollipops 10 of each pair 10d, 10e are equipped with spirals 12 and move in opposite directions from each other, so that they can assist in directing the plants, either inside the machine (A), or to move away those plants which form part of the adjacent planting line. Additionally, each pair of lollipops 10d, 10e comprises at least one cutting disc 13 equipped with a plurality of knives 14, where said discs are arranged in a position between the lollipops 10 precisely to be able to eliminate any possible knots formed by the intertwining of the plants of different planting lines.

Figure 4:
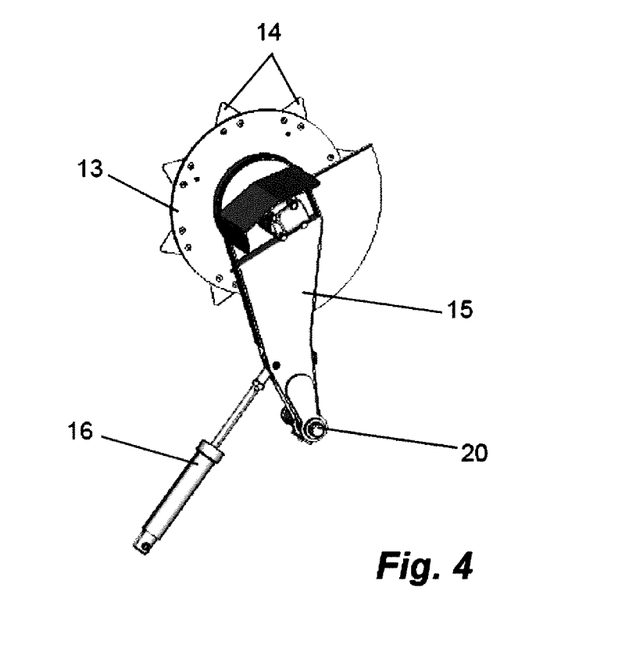
FIG. 4 shows a schematic representation of the structure of the cutting disc of the row dividers.

As can be seen in FIG. 4, cutting disc 13 may be supported by an arm 15 which is able to move the cutting disc between an upper position and a lower position, by pivoting around a pin 20 and which is activated by a hydraulic cylinder 16. In these conditions, it can be observed that the cutting disk 13 can perform a verticalized movement in accordance with the arc indicated in broken lines (Z) in FIG. 3. Both lollipops and cutting discs can be activated rotationally by appropriate means, such as a hydraulic or electric motor, mechanically through a gear shift, or other appropriate means or combinations thereof. Similarly, the rising or lowering movement of the cutting disc can be performed by other equivalent means to the arm 15 and hydraulic cylinder 16.

Also with respect to FIG. 3, it is observed that the pair of lollipops 10d passes between the planting line (P1), which is the one being harvested by the machine (A), and the planting line (P2) that is adjacent to the planting line (P1), so that the plants (p1, p2) of each line end up being intertwined and forming knots which must be cut by the cutting disc 13, in accordance with the method that is the object of the present invention.

Figure 5A:
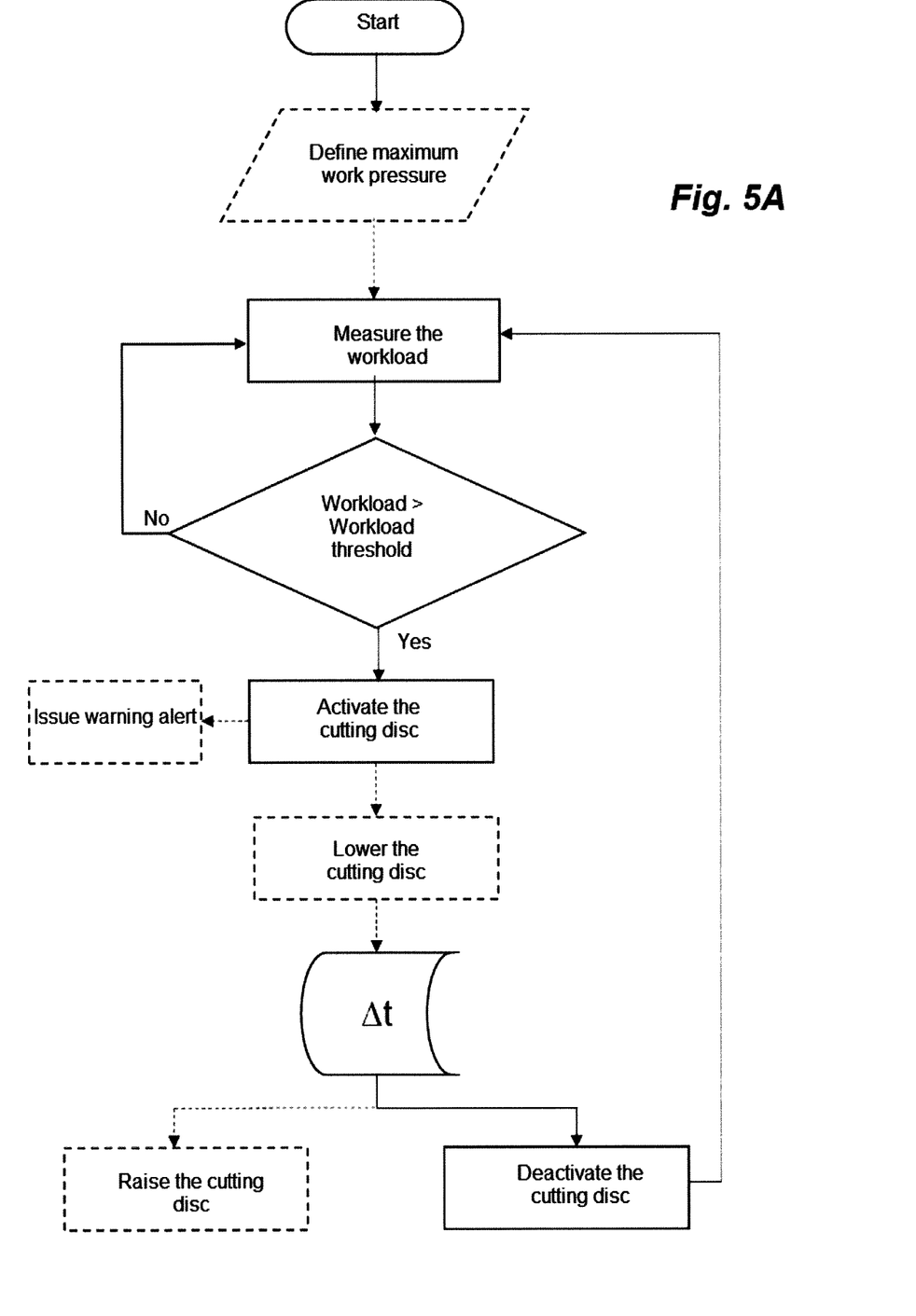
FIGS. 5A and 5B are flowcharts of embodiments of the method of activating the cutting discs of the row dividers, in accordance with the present invention
Figure 5B:
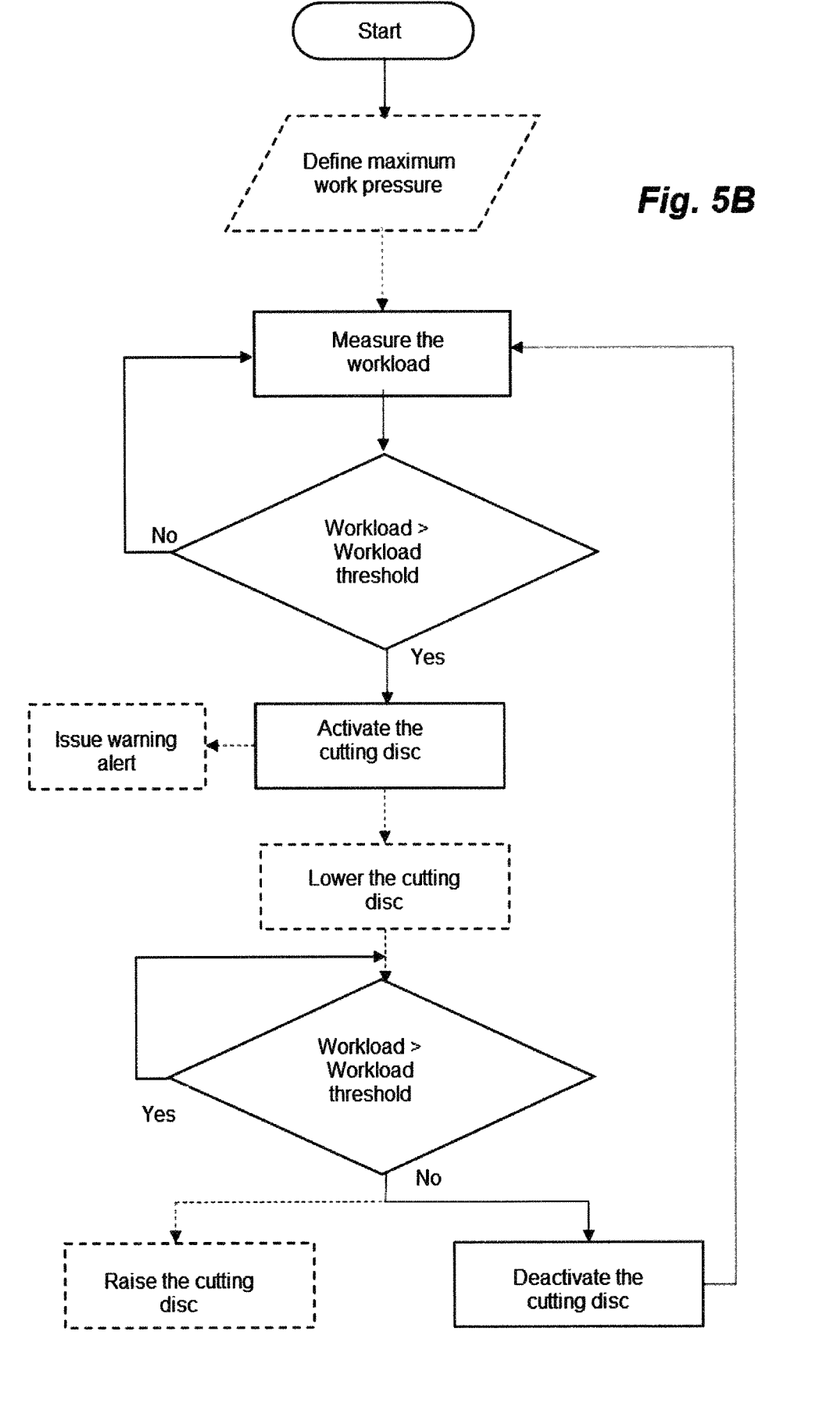

So, the method of activating the cutting discs 13 foreseen in the row dividers 10e, 10d of a harvester machine (A) basically comprises the following steps of:

a) measuring the workload of said lollipops 10;
b) comparing of the workload of said lollipops 10 with the workload threshold of said lollipops 10, which is based on a reference threshold value to, thus, determine:
b1) the return to step (a), if the workload of the lollipops 10 is less than the workload threshold; or
b2) the activation of the cutting disc 13, if the workload is equal to or greater than the workload threshold.

In accordance with one embodiment of the present invention, the above method is executed in a harvester machine (A) comprised of two row dividers 10e, 10d, each of which is formed by two lollipops 10 and also a cutting disc 13 mounted between the said two lollipops 10. More specifically, the cutting disc 13 can be mounted on the row dividers 10e, 10d, using an articulated arm 15, which enables the vertical movement of said cutting disc 13 between an upper position and a lower position, and thus makes it possible to cut potential knots formed by the adjacent planting lines, from the top to practically the base of the plants. The activation of the arm 15 can be performed, for example, using a hydraulic cylinder.

Additionally, in accordance with possible embodiments of the present invention, said lollipops 10 of the respective row dividers 10e, 10d can be activated using hydraulic motors, so that, in this case, the step (a) of measuring the workload in the lollipops is achieved by measuring the hydraulic pressure, which may vary, depending on the embodiment of the present invention, between 900 and 1500 psi, being more specifically in the order of 1200 psi. Of course, the hydraulic pressure reference may also vary from one machine to another, not without a limiting aspect of the present invention.

In accordance with another embodiment, the said lollipops 10 of the respective row dividers 10e, 10d are activated by means of electric motors and, in this case, the said step (a) of measuring the workload will be achieved by measuring the electric current of the said motor.

In addition to the principal steps mentioned above, the method of activating the cutting discs 13 of the row dividers 10e, 10d, in accordance with the present invention, comprises, specifically before the said step (a), a step of adjusting and defining the workload threshold of said lollipops 10. Furthermore, following step (b2), the method may comprise a step for keeping the said cutting discs 13 activated for a predetermined period of time ($\Delta t$), which, in accordance with the possible embodiments of this method, may vary between 5 and 60 seconds and, more specifically, this period of time ($\Delta t$) is in the order of 20 seconds.

Alternatively, after the step (b2) of activating the cutting discs, the method of this invention can be configured to comprise the step of keeping the cutting disk 13 activated until a workload is reached that is lower than the workload threshold, which is to say, the cutting disks 13 remain activated until the workload in the lollipops 10 returns to a value less than the workload reference threshold value.

Then, the method for activating the cutting discs of the row dividers may also comprise a step (d) for lowering the cutting disc 13 to a lower position, in accordance with the dotted line indicated in FIG. 3, which can be performed concomitantly, or after the said step (b2) of activating the cutting discs 13. After a predetermined time period ($\Delta t$) and/or until the workload of the lollipops returns to a value lower than the value of the workload threshold, it is possible to incorporate the step (e) of executing the raising of the cutting disc to a higher position, or to the resting position.

Finally, the method may comprise the step (f) of executing the shutdown of the hydraulic or electric motor, which activates the said cutting discs 13, considering that the lollipops 10 are not being subjected to loads (or subjected to low loads) and, thus, indicating that there are no knots between the plants of adjacent planting lines.

Optionally, and in accordance with one embodiment of the present invention, the method may comprise a configuration where, during the said step (b2) a warning signal is issued to the operator inside the operating and control cabin (C) of the machine (A). This configuration is very useful in cases where the cutting discs 13 cannot completely eliminate the knots between the adjacent planting lines and, thus, a potential specific intervention should be undertaken by the operator.

As should be appreciated by persons skilled in the art, usually, only one of the dividing lines 10e, 10d will be effectively in operation during the harvesting process since, on one side of the machine (A), there will be no plants, because the adjacent planting line (P3) has just been harvested or does not exist if the first planting line of the plantation is being harvested. In these circumstances, it is possible to include a preliminary step to define the layout of the planting lines to be harvested (P1) and the adjacent planting line (P2), in order to activate only the cutting disc 13 of the row divider 10e, 10d that is effectively working. In other words, in accordance with the present invention, the method provides for the independent activation of the motors of the cutting disc 13 of the row dividers 10e, 10d. In addition to this, the measuring of the workload of the lollipops 10, performed during step (a), can also be performed independently.

Additionally, in accordance with the embodiments of the present invention, the measurement of the workload in said lollipops 10 is achieved using an appropriate sensor, which will depend on the means of activating the lollipops 10, and may be, for example, a pressure sensor, a rotation sensor, an electric charge sensor, their variants and/or combinations thereof.

Also, also as mentioned above, the present invention concerns a harvester machine (A), particularly of tall, stalky plants, which consists of a chassis (E) mounted on belts (R) or wheels, a drive motor (M), an operation and control cabin (C), where the front portion of said chassis comprises at least one row divider 10e, 10d equipped with at least one lollipop 10 which is activated rotationally, and also possesses at least one cutting disc 13 activated rotationally and positioned near said lollipop 10. The said harvester machine is configured to perform the method of activating the cutting disk of the row dividers as described above.

The invention also concerns a header comprising row dividers with cutting discs for the row dividers, the cutting discs of the row dividers being activated rotationally and being able to move between an upper and a lower position. The platform may also comprise other elements for harvesting and cutting sugarcane, such as knockdown rollers, base cutting discs, lifting and carrier rollers. The platform is configured to execute the method as described above.

In accordance with the possible embodiments of this invention, the said harvester machine (A) is designed and developed to allow for the harvesting of sugarcane and/or sweet sorghum.

Finally, it is worth mentioning that this description is only intended to present and describe, in an illustrative manner, preferred embodiments of the method of activating the cutting discs of the dividers of a harvester machine, in accordance with the present invention. Therefore, persons skilled in the art should well appreciate that various modifications and combinations of equivalent elements and details are possible without departing from the scope of protection defined by the attached claims.

The invention claimed is:

1. A method of activating cutting discs of row dividers of a harvester machine, the harvester machine comprising an operating and control cabin, at least one row divider having at least one lollipop activated rotationally and at least one cutting disc, the method comprising
   (a) measuring a workload in the said at least one lollipop;
   (b) comparing the workload in the at least one lollipop with a workload threshold for the at least one lollipop (10), the workload threshold being based on a reference threshold value
   (c) if the workload is less than the workload threshold, maintaining the at least one cutting disc in a deactivated state while continuing to measure the workload in the at least one lollipop; and
   (d) if the workload is equal to or greater than the workload threshold, activating the at least one cutting disc.

2. The method of claim 1, wherein the at least one row divider comprises two row dividers each having a pair of lollipops, where each row divider comprises a cutting disc mounted between the pair of lollipops.

3. The method of claim 1, wherein the at least one cutting disc is mounted on an articulated arm that can moves the at least one cutting disc between an upper position and a lower position.

4. The method of claim 3, wherein the articulated arm is activated by a hydraulic cylinder.

5. The method of claim 1, further comprising adjusting and defining the workload threshold for the at least one lollipop of the row dividers, before comparing the workload to the workload threshold.

6. The method of claim 1, wherein the at least one lollipop is activated by a hydraulic motor and wherein measuring the workload in the at least one lollipop comprises measuring a hydraulic pressure associated with the hydraulic motor.

7. The method of claim 1, wherein the at least one lollipop is activated by an electric motor and wherein measuring the workload in the at least one lollipop comprises measuring a current associated with the electric motor.

8. The method of claim 1, further comprising, upon activating the at least one cutting disc in response to determining that the workload is equal to or greater than the workload threshold, maintaining the at least one cutting disc activated for a predetermined period of time.

9. The method of claim 1, further comprising, upon activating the at least one cutting disc in response to determining that the workload is equal to or greater than the workload threshold, maintaining the at least one cutting disc activated until the workload returns to a value lower than the reference threshold value.

10. The method of claim 3, further comprising lowering the at least one cutting disc to the lower position together with or after activating the at least one cutting disc.

11. The method of claim 10, further comprising raising the at least one cutting disc from the lower position after at least one of a predetermined period of time or the workload returns to a value lower than the threshold reference value.

12. The method of claim 1, further comprising shutting down the activation of the at least one cutting disc.

13. The method of claim 1, further comprising issuing a warning signal to the operator in the operation and control cabin of the harvester machine upon activating the at least one cutting disc.

14. The method of claim 5, wherein the workload threshold for the at least one lollipop comprises is a pressure ranging between a value of 900 psi and 1500 psi.

15. The method of claim 8, wherein the predetermined period of time ($\Delta t$) comprises a time period ranging between 5 seconds and 60 seconds.

16. The method of claim 15, wherein the predetermined period of time is 20 seconds.

17. The method of claim 2, wherein measuring the workload in the pair of lollipops comprises measuring the workload within each lollipop independently and wherein activating the at least one cutting disc comprises activating each cutting disc independently.

18. The method of claim 1, wherein measuring the workload in the at least one lollipop comprises measuring the workload using at least one of a pressure sensor, a rotation sensor, or an electric charge sensor.

19. A harvester machine comprising a chassis mounted on belts or wheels, a drive motor, and an operation and control cabin, where the front portion of said chassis is adapted to receive a platform comprising at least one row divider having at least one lollipop activated rotationally and at least one cutting disc activated rotationally and positioned near said at least one lollipop, the machine being configured to:
 (a) measure a workload in the at least one lollipop;
 (b) compare the workload in the at least one lollipop with a workload threshold for the at least one lollipop (10), the workload threshold being based on a reference threshold value;
 (c) if the workload is less than the workload threshold, maintaining the at least one cutting disc in a deactivated state while continuing to measure the workload in the at least one lollipop; and
 (d) if the workload is equal to or greater than the workload threshold, activating the at least one cutting disc.

20. A header comprising at least one row divider having at least one lollipop activated rotationally and at least one cutting disc activated rotationally and being able to move between an upper position and a lower position, and the header being configured to:
 (a) measure a workload in the at least one lollipop;
 (b) compare the workload in the at least one lollipop with a workload threshold for the at least one lollipop (10), the workload threshold being based on a reference threshold value;
 (c) if the workload is less than the workload threshold, maintaining the at least one cutting disc in a deactivated state while continuing to measure the workload in the at least one lollipop; and
 (d) if the workload is equal to or greater than the workload threshold, activating the at least one cutting disc.

\* \* \* \* \*